(12) United States Patent
Weibel

(10) Patent No.: US 8,557,312 B2
(45) Date of Patent: *Oct. 15, 2013

(54) METHODS FOR IMPROVING CURD YIELD OF COAGULATED MILK PRODUCTS

(76) Inventor: Michael K. Weibel, Redding, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,489

(22) Filed: Apr. 9, 2010

(65) Prior Publication Data

US 2010/0209584 A1 Aug. 19, 2010

Related U.S. Application Data

(63) Continuation of application No. 11/501,706, filed on Aug. 9, 2006, now Pat. No. 7,799,358, which is a continuation of application No. 11/288,901, filed on Nov. 29, 2005, now abandoned, which is a continuation of application No. 10/993,068, filed on Nov. 19, 2004, now abandoned, which is a continuation of application No. 10/757,825, filed on Jan. 15, 2004, now abandoned, which is a continuation of application No. 09/700,226, filed as application No. PCT/US99/10208 on May 10, 1999, now abandoned.

(60) Provisional application No. 60/085,004, filed on May 11, 1998.

(51) Int. Cl.
*A23C 9/12* (2006.01)

(52) U.S. Cl.
USPC ............... 426/36; 426/34; 426/573; 426/580; 426/658

(58) Field of Classification Search
USPC ........... 426/34, 36, 40, 42, 43, 518, 573, 580, 426/582, 583, 658
See application file for complete search history.

(56) References Cited

U.S. PATENT DOCUMENTS

| | | |
|---|---|---|
| 4,169,160 A | 9/1979 | Wingerd et al. |
| 4,374,702 A | 2/1983 | Turbak et al. |
| 4,761,203 A | 8/1988 | Vinson |
| 5,108,773 A | 4/1992 | Smith et al. |
| 5,304,387 A | 4/1994 | Hine |
| 5,385,640 A | 1/1995 | Weibel |
| 5,665,414 A * | 9/1997 | Sherwood et al. ............ 426/582 |
| 5,679,396 A | 10/1997 | Finnocchairo |
| 6,258,389 B1 | 7/2001 | Adamany et al. |
| 6,861,081 B2 | 3/2005 | Weibel |
| 7,799,358 B2 * | 9/2010 | Weibel ............................ 426/36 |
| 2006/0280839 A1 | 12/2006 | Weibel |

* cited by examiner

*Primary Examiner* — Leslie Wong
(74) *Attorney, Agent, or Firm* — Patrick J. Hagan; Dann, Dorfman, Herrell and Skillman, P.C.

(57) ABSTRACT

Disclosed are compositions and methods for enhancing the yield of coagulated milk products including cheese and other fermented milk products. Admixture of structurally expanded cellulose into milk allows substantial incorporation of additional whey solids and fluids into the caseinate matrix. The resulting interactive particle network comprising the cellulosic microfibril substructure and caseinate curd is readily manipulated by standard methods employed in the dairy industry to produce a variety of natural and processed dairy products with increased yield.

3 Claims, No Drawings

METHODS FOR IMPROVING CURD YIELD OF COAGULATED MILK PRODUCTS

RELATED U.S. APPLICATION DATA

The present application is a continuation of U.S. patent application Ser. No. 11/501,706, filed Aug. 9, 2006, now U.S. Pat. No. 7,799,358; which is a continuation of U.S. patent application Ser. No. 11/288,901, filed Nov. 29, 2005, now abandoned; which is a continuation of U.S. patent application Ser. No. 10/993,068, filed Nov. 19, 2004, now abandoned; which is a continuation of U.S. patent application Ser. No. 10/757,825, filed Jan. 15, 2004, now abandoned; which is a continuation of U.S. patent application Ser. No. 09/700,226, filed Jan. 11, 2001, now abandoned, which is the U.S. National Stage of PCT/US99/10208, filed May 10, 1999, and which claims the benefit of U.S. Provisional No. 60/085,004, filed May 11, 1998. Each of the above-mentioned applications is incorporated by reference herein.

Milk broadly consists of lipid, lactose and protein. The protein fraction is comprised of two general classes—soluble lactoalbumins and the dispersed phase micelle of casein. Casein is a remarkable protein in that it readily undergoes coagulative denaturation under acidic conditions or by action of certain proteinases designated as rennets. The resulting curd is then manipulated to form cheeses and other fermented milk foods.

Milk is readily fractionated into lipid and nonlipid fractions. The latter fraction can be dried into a shelf-stable powder designated nonfat dry milk (NFDM). Likewise the whey byproduct of cheese manufacture is readily dried into a stable powder. Both products are used extensively as functional ingredients in many food products. In general milk and derived milk products are bought and sold on the basis of milk solids content. Most processed milk products have standards of identity defining the moisture and solids content. In this regard milk solids content is highly variable—for example yoghurt is approximately 10% solids and romano cheese approximately 77% solids. Hence yield is highly correlated with recovered milk solids and any method that recovers traditionally lost milk solids into the final product could have substantial economic impact. In the case of cheese, whey solids represent unrecovered material.

With the advent of consumer demand for reduced calorie and no fat variants of standardized products, increased moisture incorporation to reduce caloric density and partially replace lipids is an area of considerable interest. For such nonstandardized dairy products yield is still indexed to recovered milk solids but additionally is leveraged by increased moisture content; every additional pound of moisture incorporated into the finished product results in a net one pound gain of product. Hence yield enhancement for these products is a combination of milk solids recovery and moisture incorporation, provided a product with satisfactory organoleptic quality can be achieved.

For purposes of describing this invention, yield enhancement or improvement refers to the incremental increase in the amount of recovered product versus a control experiment. The incremental increase will result from a combination of additional incorporated milk solids and moisture.

The dairy industry has long been concerned with yield improvement (see for example "Factors Affecting the Yield of Cheese" published by the International Dairy Federation (Brussels, Belgium) 197p, 1991 and "Cheese Yield and Factors Affecting Its Control" IDF (Brussels, Belgium) 540p, 1994). With the exception of products such as yoghurt and buttermilk where the entire milk base is conserved, substantial losses of milk solids occur in the whey. Whey solids frequently represent a co-product liability as their cost of recovery matches or exceeds their market value. A method of incorporating more whey solids into fermented dairy products would not only enhance recovered product yield, but could materially contribute to a reduction in whey discharge.

It has now been found that certain forms of cellulose designated structurally expanded celluloses (SEC) which are described below, have the unexpected effect of dramatically increasing curd yield when incorporated into skim or full fat milk. The SEC appears to become intimately incorporated into the caseinate gel structure early on reducing the rate and extent of syneresis characteristic of caseinate curds. The result is that more whey and whey protein solids are incorporated into the curd structure and carried into the low pH cooking environment. Depending on the product, it has been found that much more moisture is retained in mechanically dewatered curds. Insofar as is known, it has not previously been proposed to use SEC in the art of making cheese and fermented milk products.

In order to appropriately define and distinguish structurally expanded cellulose, SEC, from other forms of cellulose and hydrocolloidal polymers and gums mentioned herein, it is necessary to briefly examine cellulose structure and methods of manipulation. For example powdered cellulose is known in the art of cheese manufacture as an anticaking agent for ground cheese products. Carboxymethyl cellulose and other cellulose ethers have been considered as useful additives to enhance texture of low-fat skim and processed cheese products. Hence differentiation of SEC from other types of "cellulose" known in the art of cheese manufacture is important for distinguishing SEC from prior art.

In chemical terms cellulose specifically designates a class of plant derived linear, glucose homopolysaccharides with B 1-4 glycosyl linkage. It is the dominant structural polysaccharide found in plants and hence the most abundant polymer known. The function of cellulose is to provide the structural basis for the supramolecular ensemble forming the primary wall of the plant cell. Differentiation and aggregation at the cellular level are highly correlated with cellulose biosynthesis and assembly. In combination with lignin, heteropolysaccharides such as pectin and hemicelluloses and proteins, the cellulosic containing primary cell wall defines the shape and spatial dimensions of the plant cell. Therefore cellulose is intimately involved in tissue and organelle specialization associated with plant derived matter. Over time the term "cellulose substance" or simply "cellulose" has evolved as a common commercial describer for numerous non-vegetative plant derived substances whose only commonality is that they contain large amounts of B 1-4 linked glucan. Commercially, combinations of mechanical, hydrothermal and chemical processing have been employed to enrich or refine the B 1-4 glucan content to various degrees for specific purposes. However, only highly refined celluloses are useful substrates for structural expansion. Examples of highly refined celluloses are those employed as chemical grade pulps derived from wood or cotton linters. Other refined celluloses are paper grade pulps and products used in food. The latter are typically derived from nonwoody plant tissues such as stems, stalks and seed hulls.

Refined cellulose can be considered a supramolecular structure. At the primary level of structure is the B 1-4 glucan chain. All cellulose is similar at this level. Manipulation at this level would by necessity involve chemical modification such as hydrolysis or substitution on the glycosyl moiety. However, as outlined next this level of structure does not exist as an isolated state in other than special solvent systems which are able to compete with extremely favorable intermolecular energies formed between self associating B 1-4 glucan chains.

In contrast to primary structure, a stable secondary level of structure is formed from the nascent B 1-4 glucan chains that spontaneously assemble into rodlike arrays or threads, which are designated the microfibril. The number of chains involved is believed to vary from 20 to 100. The dimension of the microfibril is under the control of genetic expression and hence cellulose differentiation begins at this level. Pure mechanical manipulation is not normally practiced at this level of organization. However, reversible chemical modification is the basis for commercial production of reconstituted forms of cellulose fibers such as rayon. Chemical substitution by alkylation of the glycosyl moiety yields stable ether substituted B 1-4 glycans which no longer self assemble. This reaction forms the basis for the production of commercial forms of cellulose ethers such as carboxymethyl (CMC), hydroxyethyl (HEC), hydroxypropyl (HPC) and methyl or ethyl (MC & EC) cellulose. One further modification at the secondary structural level involves intensive acid hydrolysis followed by application of high shear to produce colloidal forms of microcrystalline cellulose (MCC). This modification is best deferred to the next level of structure as most forms of MCC are partially degraded microfibril aggregates.

The third level of cellulose structure is that produced by the assemblage of microfibrils into arrays and ribbon like structures to form the primary cell wall. As in the case of secondary structure, tertiary structure is under genetic control but additionally reflects cellular differentiation it is at this level that other structural polymeric and oligomeric entities such as lignin and proteins are incorporated into the evolving structure. Selective hydrolytic epolymerization and removal of the non-cellulose components combined with application of sufficient shear results in individually dispersed cellular shells consisting of the cellulosic skeletal matrix. With the removal of strong chemically and physically associated polymeric moieties which strengthen the cellulose motif, structural expansion by mechanical translation and translocation of substructural elements of cellulose can begin to occur.

The process by which structural expansion occurs is that of rapid anisotropic application of mechanical shear to a dispersed phase. Particles of refined cellulose, consisting of cellular fragments, individual cells or aggregates of a few cells, are dispersed in a liquid. The continuous liquid phase serves as the energy transduction medium and excess enthalpy reservoir. While the individual forces maintaining secondary and tertiary structure of the refined cellulose particles are largely noncovalent and hence of relatively low energy, the domains of collective ensembles possess extraordinary configurational stability due to the large number of interactions. Only by application of intense hydraulic gradients across a few microns and on a time scale that precludes or minimizes relaxation to mere translational capture, can sufficient energy be focused on segments of the refined cell wall to achieve disassembly of tertiary and secondary structure. In practice a small fraction of the applied energy is captured by structural expansion of the dispersed phase. The vast majority of useful energy is lost into enthalpy of the continuous phase and can complicate processing due to high temperature excursions. As disassembly progresses and the structures become smaller and selectively more internally ordered, disassembly rates diminish rapidly and the process becomes self limiting.

Three general processes are known in the art of cellulose manipulation to provide structurally expanded celluloses useful for practice of this invention. The simplest is structural modification from intense shear resulting from high velocity rotating surfaces such as a disk refiner or specialized colloid mill, as described in U.S. Pat. No. 5,385,640. A second process is that associated with high impact discharge such as that which occurs in high pressure homogenization devices, such as the Gaulin homogenizer described in U.S. Pat. No. 4,374,702. The third process is that of high speed, wet micromilling whereby intense shear is generated at the collision interface between translationally accelerated particles, as described in U.S. Pat. No. 4,761,203. It would be expected that anyone skilled in the art could apply one or combinations of the above processes to achieve structurally expanded forms of cellulose useful in the practice of this invention.

The entire disclosures of the above-mentioned U.S. Pat. Nos. 4,374,702, 4,761,203 and 5,385,640 are all incorporated by reference in the present specification, as if set forth herein in full.

Two other commercial modifications are commonly employed at this structural level and are mentioned to distinguish the resulting product from SECs. The first involves indiscriminate fragmentation by various dry grinding methods to produce powdered celluloses and is widely practiced. Such processes typically result in production of multimicron dimensional particles as intraparticle fragmentation and interparticle fusion rates become competitive in the low micron powder particle size region. Typical powdered celluloses contain particle size distributions ranging from 5 to 500 microns in major dimension and may be highly asymmetric in shape. These products are employed as anticaking or flow improvement additives for ground and comminuted forms of cheese. The second process involves strong acid hydrolysis followed by moderate dispersive shear producing colloidal microcrystalline cellulose (MCC). It is believed that certain less ordered regions comprising tertiary structure are more susceptible to hydrolytic depolymerization than highly ordered domains resulting in shear susceptible fracture planes. Dispersed forms of MCC are needlelike structures roughly three orders of magnitude smaller than powdered celluloses and range from 5 to 500 nanometers in width to longitudinal dimension, respectively. On spray drying MCC aggregates to form hard irregular clusters of microcrystals whose particle dimensions range from 1 to 100 microns. The resulting MCC clusters can serve as a precursor to a unique SEC best described as a microscopic "puff ball" reported in U.S. Pat. No. 5,011,701 and is reported to be a fat mimetic. MCC also finds application as a rheology control agent in processed cheese products.

Finally, the quaternary or final structural level of cellulose is that of the cellular aggregate and is mentioned only for completeness. These substances may be highly lignified such as woody tissue or relatively nonlignified such as those derived from the structural stalks and seed hulls of cereal grain plants. Commercial types of these materials are basically dried forms of nonvegetative plant tissue. These moderately elastic substances respond to mechanical processing by deformation and ultimate fracture along the principal deformation vector. Consequently, these materials readily undergo macroscopic and microscopic size reduction and are reduced to flowable powders by conventional cutting, grinding or debridement equipment. Because of the cohesive strength of the molecular ensemble comprising quaternary structure, these materials are not candidates for systematic structural expansion at the submicron level without chemical intervention.

Structural expansion as defined herein is a process practiced on refined celluloses involving mechanical manipulation to disassemble secondary and tertiary cellulose structure. The ultimate level of expansion would be to unravel the cell wall into individual microfibrils. Although plant specific, a typical microfibril is best described as a parallel array of 25 to 100 B 1,4 glucan chains with diameter in the 50 nanometer range and variable length ranging from submicron to micron multiples. In practice generation of a dispersed microfibril population is not a realistic objective and only of academic interest. What is usually achieved because of the relatively indiscriminate application of mechanical energy is a highly heterogeneous population of miniature fibrils, ribbon-like and slab-like structures. These structures display irregular distention of individual microfibrils and aggregates of microfibrils from their surfaces and at internal and external discontinuities. The ensuing collage consists of an entangled and entwined network of cell wall detritus to form a particle gel. Some of the larger structural features with dimensions in the micron range are discernible with the light microscope; however higher resolution techniques such as scanning transmission electron microscopy are necessary for detailed observation of submicron features. This particle gel network exhibits a vast increase in surface area associated with the volumetric expansion and projection of cell wall structure into the continuous phase medium. Lastly, structurally expanded celluloses useful for purposes of this invention may be further characterized by possessing a water retention value greater than 350 and a settled volume of at least 50% for a 5% w/w dispersion of said SEC in aqueous media.

It is contemplated that certain soluble hydrocolloids may be useful in practice of the invention. Dispersive hydrocolloids such as carboxymethylcellulose, CMC, are believed to bind to SECs through interaction of unsubstituted regions on the glucan backbone with the SEC surface, perhaps on the distended microfibril. The presence of carboxymethyl substituents imparts anionic polyelectrolyte character to the CMC backbone and hence on its association with SEC imparts a stationary negative charge to the SEC surface. This stationary charge is believed to help control flocculative association of SEC and perhaps enhance interaction with colloidal lipid and casein micelles. Other associative hydrocolloids which bind to cellulose such as glucomannans (for example guar gum) help to control water mobility. Colloids, such as MCC, and hydrocolloids, such as xanthan and gellan gums are SEC interactive and assist in fine tuning gel structure for the colloidal-network caseinate system. Locust bean gum, konjac gum, pectin and the like may also be used for this purpose.

The effect of SEC on curd yield is dramatic, particularly when used in the range from about 0.05% to about 0.5%, based on the weight of the milk with which it is admixed. For example the incorporation of SEC at levels of 0.1% w/w based on fluid milk result in significant yield improvements two orders of magnitude greater than the incremental percent of SEC solids. The incorporation of SEC into fluid milk is readily achieved using both dried and prehydrated paste forms. The following examples are illustrative for practice of the invention by one normally skilled in the art and are not intended to limit its scope.

DESCRIPTION OF THE INVENTION AND EXAMPLES

Two methods for characterizing SEC are useful for purposes of practicing this invention. The first is a simple settled volume test. A powdered or prehydrated SEC is fully dispersed at a specified mass into a specified volume of water. The apparatus usually employed to measure settled volume is the graduated cylinder. The dispersed cellulose phase is allowed to gravity settle to a constant bed volume (usually 24 hr) which to a first approximation reflects the specific dispersed phase volume or degree of structural expansion. SEC useful for practicing this invention is characterized by gravity settled volumes of at least 50% for a 5% w/w aqueous suspension of cellulose. For example a 5% w/w suspension of powdered celluloses characterized as 200 mesh from cottonseed (BVF-200, International Filler Corporation, North Tonawanda, N.Y.), refined wood pulp (BW-200, Fiber Sales & Development Corporation, St. Louis, Mo.) and refined soy hulls (FI-1, Fibred Inc., Cumberland, Md.) yield settled volumes of 31.2%, 23.2% and 22.4%, respectively in 24 hr. These forms of cellulose while potential precursors for SEC are readily distinguished from SEC by this test. A second method of characterization involves viscometry. SEC begins to form volumetrically sustainable, continuous particle gels at concentrations in the vicinity of 0.5% w/w in the absence of other dispersed substances. This critical concentration may be significantly reduced in the presence of other dispersed colloidal matter. The onset of formation of the particle gel and the gel strength are characteristic of the type of SEC and the degree of structural expansion. Typically, the particle gels exhibit well behaved, reversible pseudoplastic behavior in the 1% to 3% w/w concentration range. This behavior can be modeled by the power law using a rotational viscometer such as the Brookfield DVIII, a programmable rheometer (Brookfield Engineering Laboratories, Inc., Stoughton, Mass.). A log/log plot of the shear rate versus shear stress at a specified concentration gives two characteristic system parameters: the flow index and consistency index. The consistency index is reflective of intrinsic gel strength (resting state extrapolation) and the flow index which is indicative of the degree of pseudoplasticity or dynamic particle/particle shear dependent interactivity. SECs useful for the practice of this invention are preferably characterized by displaying pseudoplastic behavior which is modeled by the power law. In the range of 1-2% w/w at 20 deg. C. the preferred SECs display flow indexes less than unity and typically in the range of 0.2 to 0.7. The preferred consistency indexes typically range from 500 to 10,000 cp.

In the following examples, actually fermented cheese products are made in the usual way with the improvement that SEC is dispersed in milk at the beginning of the process. Thereafter, the appropriate culture is added to the milk which is then allowed to ferment for the prescribed time, depending on the type of cheese, to establish a robust culture. A coagulant, e.g., rennet, is added or not, as the case may be. The coagulum is cut into pieces and then subjected to conditions causing water to be expressed from the coagulum, which may be gravity draining, melting/agglomeration or mechanical pressing, it can again depending on the type of cheese.

Example 1

Skim Milk Curd

Four gallons of pasteurized skim milk were equilibrated at room temperature and pooled. The pooled milk contained 8.09% nonvolatile solids (104° C. oven to constant weight, typically 24 hr.). For each of four experiments a 3500 portion was microwaved to reach a temperature of 88° F. A never dried paste concentrate of SEC from refined cotton seed linters (CS-SEC) was prepared as described in U.S. Pat. No. 5,385,640. The experiments were conducted at CS-SEC concentrations of 0.00, 0.11, 0.17, and 0.22% w/w. The solids content of the paste was 6.66% on an "as is" basis and the power law characterization parameters were 0.35 and 4838 cp for the flow index and consistency index, respectively, determined for a 1.5% w/w aqueous dispersion at 20° C. The indicated amounts paste form of the CS-SEC was initially mixed with sufficient milk to give a volume of 500 ml and dispersed into the milk by means of a rotor/stater dispersator (Omni Mixer ES, Omni International, Gainesville, Va.) operating with a 35 mm generator at 6000 rpm for 3 minutes. After dispersing the CS-SEC, it was added to the remainder of the milk plus any additional water and mixed on the dispersator assembly for 3 minutes at 8000 rpm. The active culture was added two minutes into the mixing process. The culture employed was a freeze dried, mesophilic lactic culture (R707Chr. Hansen, Inc., Milwaukee, Wis.). It was a direct vat culture (DVC) used at 1 unit/gal of milk. The culture was prepared by addition of 1.54 g lyophilized powder to 120 g skim milk. After 15 minutes hydration, the culture was dispersed by means of a small hand held dispersator (Omni 1000, Omni International) operating a 10 mm generator for 1 min at 10000 rpm. A 25 g aliquot of the culture solution was used for each 3500 g (approximate one gallon) milk experiment. The composition of each experiment is summarized in TABLE 1.

TABLE 1

|    | skim milk | CS-SEC paste | water | culture mixture |
|----|-----------|--------------|-------|-----------------|
| #1 | 3500 g    | -0-          | 120 g | 25 g            |
| #2 | 3500 g    | 60 g         | 60 g  | 25 g            |
| #3 | 3500 g    | 90 g         | 30 g  | 25 g            |
| #4 | 3500 g    | 120 g        | -0-   | 25 g            |

The mixtures were placed in a circulated air oven to incubate at 88 deg. F. (31 deg. C.). After one hour 0.25 ml of microbial chymosin (Chymax II, 50000 MCU/ml, Chr. Hansen, Inc.) was added to each and the incubation continued until the pH reached 4.6 (approximately 6 hours). The curds were cut and allowed to relax for 15 minutes. The following sequence of heating by microwave and gentle mixing was initiated to cook the curds. Each container containing the cut curds was first microwaved to reach a temperature of 107 deg. F. and placed in a circulated air oven at 130 deg F. After one hour the containers and contents were microwaved again to 125 deg F. and reincubated. After another 1.5 hour the containers and contents were microwaved to 130 deg F. and reincubated. Finally, after one hour the containers and contents were microwaved to 147 deg F. This ramped sequence of temperature increases represents a convenient laboratory scale, curd cooking protocol. After one hour the cooked curd was drained using a cheese cloth lined colander at room temperature for 12 hours. The mass of recovered curd and whey was recorded and the nonvolatile solids of each fraction determined (104 deg C. to constant weight). The mass balance results are summarized in TABLE 2.

TABLE 2

|    | Starting solids* | whey solids | curd solids | final solids | % recovery |
|----|------------------|-------------|-------------|--------------|------------|
| #1 | 283.2 g          | 189.7 g     | 113.4 g     | 303.1 g      | 107%       |
| #2 | 287.2 g          | 175.3 g     | 124.8 g     | 300.1 g      | 104%       |
| #3 | 289.2            | 172.8 g     | 126.8 g     | 299.6 g      | 104%       |
| #4 | 291.2            | 177.2 g     | 135.4 g     | 312.6 g      | 107%       |

*milk solids @ 8.09% × 3500 g + CS-SEC solids

The mass balance appears self consistent from the above data. TABLE 3 summarizes the key yield parameters.

TABLE 3

|    | % recovery of curd solids based on starting solids | net yield of curd solids versus control |
|----|-----------------------------------------------------|------------------------------------------|
| #1 | 40.0%                                               | —                                        |
| #2 | 43.4%                                               | 8.5%                                     |
| #3 | 44.1%                                               | 10.0%                                    |
| #4 | 46.5%                                               | 16.2%                                    |

It is clear that small amounts of CS-SEC impart relatively large systematic yield increases in curd yield as a function of increasing concentration.

Example 2

Cottage Cheese

Cottage cheese represents a fermented cheese product with the simplest curd processing. Basically, the cut, cooked curd is washed, salted and at the option of the processor remixed with a cream based dressing. A similar procedure to EXAMPLE 1 was used for curd production with the exception that a mixed frozen culture was used. One gram of frozen cultures LB-12 and St-C-5 (Chr. Hansen, Inc., Milwaukee, Wis.) representing thermophilic lactic cultures *Lactobacillus* and *Streptococcus*, respectively, were dispersed into 105 g of skim milk according to the protocol of EXAMPLE 1. The skim milk was not pooled, but each gallon possessed the same production time stamp and the average solids content was 8.25%. The composition of each experiment is summarized in TABLE 4.

TABLE 4

|    | Skim milk | Water | CS-SEC paste |
|----|-----------|-------|--------------|
| #1 | 3836 g    | 80 g  | -0-          |
| #2 | 3845 g    | 40 g  | 40 g         |
| #3 | 3842 g    | 20 g  | 60 g         |
| #4 | 3851 g    | -0-   | 80 g         |

After final cooking of the curd was complete, the curds were then suspended in two liters of cold water and gravity drained in a cheesecloth lined colander for 16 hours under refrigerated conditions. The drained curds were salted at 1% w/w. The results are summarized below in TABLE 5.

TABLE 5

|    | First Wash weight | Final weight | Curd yield | salt addn | % solids | % yield |
|----|-------------------|--------------|------------|-----------|----------|---------|
| #1 | 663.4 g           | 588.0 g      | 100%       | 5.9 g     | 15.8     | 100     |
| #2 | 783.3 g           | 684.8 g      | 117%       | 6.8 g     | 14.9     | 110     |
| #3 | 1111.0            | 721.5 g      | 123%       | 7.2 g     | 14.7     | 114     |
| #4 | 1233.8            | 733.0 g      | 124%       | 7.3 g     | 14.9     | 117     |

It is seen that the curd yield which represents both additional water and solids capture slightly exceeds the recovered solids yield of the right hand column. A major yield improvement arises from the first increment of CS-SEC representing 0.1% w/w CS-SEC solids.

Example 3

Mozzarella Cheese

Mozzarella cheese represents a form of cheese in which the cooked curd is thermally melted and dewatered in situ. The coalesced curd mass is formed into a ball and incubated in a saturated brine solution. A 3700 g aliquot of pasteurized skim milk at 8.14% nonvolatile solids was equilibrated to room temperature (66 deg. F.). The control contained 60 g water plus 25 g of mixed culture and the test contained 60 g of the CS-SEC paste plus 25 g mixed culture solution described in EXAMPLE 2. The mixing, incubation and coagulation protocols were the same as in EXAMPLE 1 except the temperature was 92 deg. F. (33.5 deg C.). After cutting the curd the cut curd mixture was heated to 110 deg. F. (33.5 deg. C.) using a microwave oven. After 1 hour the whey was drained to the level of the curd and the incubation continued at 110 deg F. until the pH reached 5.2. The curd was then drained and washed once with 1 liter of water. Salt was added at 0.75% w/w based on curd weight and the curd was immersed in 2 liters of water at 160 deg. F. The melting and coalescing curds were pressed into a coherent mass by means of a large wooden spoon. The curd mass was formed into a ball within a cheese cloth shroud and incubated in a saturated salt brine for 2 hours. The results of the experiment are summarized in TABLE 6.

TABLE 6

| | Skim yield | CS-SEC weight | Water weight | Final weight | Cheese yield | % solids | % solids recovered |
|---|---|---|---|---|---|---|---|
| #1 | 3700 g | - 0 - | 60 g | 239.8 g | 100% | 46.4 | 36.9 |
| #2 | 3700 g | 60 g | - 0 - | 275.2 g | 115 | 39.6 | 36.2 |

The results indicate that the yield of skim milk solids remained about the same and that the yield increase was largely due to additional water incorporation.

Example 4

Cheddar Cheese

Cheddar cheese represents a mechanically dewatered curd which is press formed into a wheel or plug shape, peripherally sealed and subsequently aged. During the latter process it undergoes an aging and fermentative development to develop a unique flavor profile. The yield of the cheese however is set prior to the aging process.

For the experiment described below a specialized pneumatic press was constructed to run four simultaneous experiments. It consisted of four parallel mounted pneumatic air cylinders each possessing an internal drive cylinder diameter of 2.5 inches. The drive rod was connected to a Clevis adaptor attached to a 4.5 inch diameter plastic driver enclosed within a 4.6 inch diameter cylindrical press housing. Holes in the sides of the housing were drilled to allow vertical drainage of the expressed whey. The bottom segment of the cylinder contained an elevated but structurally supported coarse lattice platform for bottom drainage. The assembly was pressurized by means of a nitrogen gas tank and the pressure regulated with a two stage diaphragm regulator. Typically the press cylinder was lined with nylon cheese cloth. A 4.25 inch circular 60 mesh stainless steel screen was employed as a retaining barrier and for support of the liner against the lattice base. The curd mass to be pressed was packed into the lined cylinder and the cheese cloth liner carefully folded over the top of the packed curd. A second 60 mesh stainless steel circular screen segment was placed on top and the drive assembly manually positioned in place. The volumetric compression of cheeses in the experiments to be described were not limited by mold design stops as are commercial presses. This allows unrestricted compression which is limited only by the compressibility or intrinsic water holding capacity of the curds in question. This provides a measure of the true cheese yield at equivalent compressive equilibrium conditions for an experimental set in which one or more parameters are systematically varied. Commercial yields would be in excess of those reported here due to much greater water retention associated with controlled volumetric compression.

Pasteurized skim milk with a nonvolatile solids content of 8.40% w/w was used. CS-SEC past and BVF-200 (a powdered cotton seed cellulose) were identified and sourced previously. The culture used was the lyophilized lactic acid preparation R707 identified previously and used at 1.5 g per 3800 g skim milk. It was suspended in 100 ml of the skim milk and allowed to hydrate for 15 min. at which time it was dispersed by use of the Omni 1000 operating at 10000 rpm, 10 mm generator for 1 min. The predispersion of CS-SEC and BVF-200 prior to incorporation into the skim milk base was similar to that described in EXAMPLE 1. The skim milk base was preheated to 90 deg F. prior to admixing with the other components. The culture was added in sequence also described in EXAMPLE 1. The composition of the experimental set is summarized in TABLE 7.

TABLE 7

| | Skim milk | Water | CS-SEC paste | BVF-200 fiber | Culture solution |
|---|---|---|---|---|---|
| #1 | 3800 g | 120 g | - 0 - | - 0 - | 100 g |
| #2 | 3800 g | - 0 - | 120 g | - 0 - | 100 g |
| #3 | 3800 g | 112 g | - 0 - | 8 g | 100 g |
| #4 | 3800 g | 104 g | - 0 - | 16 g | 100 g |

The primary fermentation was run for 1 hr at 90° F. A 0.7 ml aliquot of Chymax II was added and the coagulation allowed to occur for 1 hr. The curd was cut and allowed to heal for 15 min. at which time the temperature was raised to 100° F. by microwave treatment. The whey was drained by decantation and cheddaring started in a 100° F. circulating air oven. The curds were turned approximately every 15 minutes. After two hours the curd mass was shredded and salted (8 g) and incubated 15 min before moving to the press stage. The pressing sequence was 10 min @ 10 psi, rotate the press cake, 10 min @ 10 psi and rotate the press cake and 8 hr @ 40 psi. Note: the pressure reflects primary cylinder pressure whereby the actual pressure at the press cake is 0.55 of the cylinder discharge pressure. The pressed cake was unloaded from the press assembly and encompassing cheese cloth, blotted and weighed. The pressed cheese cakes were then air dried for 48 hr on a cutting board, turning the cheese piece approximately every 12 hr. After drying the individual cheese pieces were enrobed with wax and stored at 34-40° F. to age. At the time of this disclosure the cheeses were 5 months into their aging process. No organoleptic or moisture analyses have been performed on these cheeses to date and await the 12 month aging stage anniversary. The results of the experiment are summarized in TABLE 8.

TABLE 8

| | Curd weight | Pressed weight | Yield % | CS-SEC DB wt | BVF-200 DB wt |
|---|---|---|---|---|---|
| #1 | 290.8 g | 232.9 g | 100% | - 0 - | - 0 - |
| #2 | 517.0 g | 312.4 g | 133% | 8 g | - 0 - |
| #3 | 325.6 g | 254.8 g | 109% | - 0 - | 8 g |
| #4 | 353.5 g | 249.2 g | 107% | - 0 - | 16 g |

The results show a substantial improvement in the exhaustively pressed cheese product for the CS-SEC at 0.2% w/w. The increased yields for the powdered cellulose were marginal at twice the concentration. Lastly, the pressed cheese based on SEC was uniform while the powdered cellulose containing cheeses were mottled and indicative of clumped aggregates of cellulose. These clumps presumably were the result of settling of the powdered cellulose particles to the bottom of the container during coagulation and continued segregation during shredding, subsequent mixing and pressing.

Example 5

Cheddar Cheese

In this example another form of cellulose is compared to SEC. Microcrystalline cellulose (MCC) has been described earlier and a commercially redispersible form CL-611 (FMC Corp., Philadelphia, Pa.) was used as a comparison. MCC is not considered an SEC but is a colloidally dispersible form of cellulose that forms particle gels in the presence of CMC, albeit at higher concentrations than SEC. The purpose of this experiment was to show that SEC is much more effective than MCC in the production of enhanced yields of cheddar cheese. The protocol of EXAMPLE 5 was employed with the same skim milk solids. MCC CI-611 was used at the same concentrations as BVF-200 of the prior example. TABLE 9 summarizes the results.

TABLE 9

|    | Curd weight | Pressed weight | Yield % | CS-SEC DB wt | MCC DB wt |
|----|-------------|----------------|---------|--------------|-----------|
| #1 | 322.6 g     | 254.9 g        | 100%    | - 0 -        | - 0 -     |
| #2 | 468.4 g     | 304.5 g        | 119%    | 8 g          | - 0 -     |
| #3 | 340.9 g     | 271.0 g        | 106%    | - 0 -        | 8 g       |
| #4 | 366.6 g     | 264.0 g        | 104%    | - 0 -        | 16 g      |

The results show that MCC at twice the concentration of SEC does not substantially improve pressed weight yield of cheddar.

Example 6

Processed Cheese

It is anticipated that SEC's will find extensive use in processed cheeses in addition to their use in naturally fermented cheeses. The same interactions of SEC with the caseinate microcell that have been demonstrated to occur when premixed with milk and subsequently coagulated are expected to be found in the case of admixture with precoagulated caseinates such as regular cheese melts and isolated sodium or calcium caesinates.

What is claimed is:

1. A method for preparing a milk base for the production of enhanced yield coagulated milk products by admixing milk with at least one structurally expanded cellulose (SEC), the resulting admixture consisting essentially of milk and from about 0.05% to about 0.5% of SEC solids, based on the weight of said milk, thereby forming said milk base, said milk base being effective to increase curd yield in a coagulated milk product that results upon inoculation of said milk base with a culture that produces said product, said increase being in the range of 8.5% to 33%, compared to the same coagulated milk product that does not include said SEC.

2. A method as claimed in claim 1, wherein said at least one structurally expanded cellulose is admixed in dry form with said milk.

3. A method as claimed in claim 1, wherein said at least one structurally expanded cellulose is admixed in paste form with said milk.

* * * * *